(12) United States Patent
Hsieh

(10) Patent No.: US 8,010,172 B2
(45) Date of Patent: Aug. 30, 2011

(54) ELECTRONIC DEVICE

(75) Inventor: Fu-Chung Hsieh, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 638 days.

(21) Appl. No.: 12/129,619

(22) Filed: May 29, 2008

(65) Prior Publication Data

US 2009/0170575 A1    Jul. 2, 2009

(30) Foreign Application Priority Data

Dec. 27, 2007  (TW) ............................. 96150588 A

(51) Int. Cl.
*H04M 1/00*    (2006.01)

(52) U.S. Cl. ............... 455/575.4; 455/566; 361/679.01; 345/168; 359/822

(58) Field of Classification Search .................. None
See application file for complete search history.

(56) References Cited

U.S. PATENT DOCUMENTS

2007/0293286 A1* 12/2007 Park et al. .................. 455/575.1
2008/0032095 A1*  2/2008 Kato et al. .................. 428/139
2008/0186663 A1*  8/2008 Chen .......................... 361/681

FOREIGN PATENT DOCUMENTS

CN          101084667       12/2007

OTHER PUBLICATIONS

"1st Office Action of China Counterpart Application", issued on Jun. 28, 2010, p. 1-p. 4, in which the listed reference was cited.

* cited by examiner

*Primary Examiner* — Phuoc Doan
(74) *Attorney, Agent, or Firm* — Jianq Chyun IP Office

(57) ABSTRACT

An electronic device including a first module, a second module, at least one first spacer, and at least one second spacer is provided. The first module has a carrying surface. The second module is slidably disposed on the carrying surface and has a bottom surface opposite to the carrying surface. The first spacer is fixed on the carrying surface and suitable for being slid on the bottom surface. The second spacer is fixed on the bottom surface and suitable for being slid on the carrying surface. The first spacer and the second spacer are always kept within an overlapping region between the bottom surface and the carrying surface.

11 Claims, 2 Drawing Sheets

ELECTRONIC DEVICE

CROSS-REFERENCE TO RELATED APPLICATION

This application claims the priority benefit of Taiwan application serial no. 96150588, filed on Dec. 27, 2007. The entirety of the above-mentioned patent application is hereby incorporated by reference herein and made a part of specification.

BACKGROUND OF THE INVENTION

1. Field of the Invention

The present invention generally relates to an electronic device, in particular, to an electronic device composed of two modules capable of being slid with respect to each other.

2. Description of Related Art

Along with the development of science and technology, the dependence of human on electronic products is growing. Due to the requirements of users for electronic products, such as high speed, high performance, and being light, thin, short, and small, a variety of electronic devices have been developed currently, for example, ultra mobile personal computers (UMPCs), personal digital assistants (PDAs), and mobile phones.

In order to improve the convenience for typing and inputting, some of the electronic devices are provided with a Qwerty keyboard disposed thereon. However, as the Qwerty keyboard and a display screen are located at the same surface of the electronic device, the size of the electronic device is increased. Therefore, most of the current electronic devices adopt a clamshell-type design or a sliding-type design. Therefore, the Qwerty keyboard and the display screen can be disposed on two overlapping modules respectively, so as to decrease the size of the electronic device.

It should be noted that, the electronic device of a sliding-type design always has spacers made of an abrasion-resistant material on a bottom surface of an upper module or a top surface of a lower module. Two modules can be sliding more easily with respect to each other due to the spacers, and the spacers can prevent the Qwerty keyboard from being worn during sliding.

However, in conventional techniques, the spacers are exposed out of the modules when the two modules are slid away from each other, thus affecting the appearance of the electronic device. Further, if the spacers are disposed on the top surface of the lower module, the size of the lower module should be increased to contain the Qwerty keyboard and the spacers.

SUMMARY OF THE INVENTION

Accordingly, the present invention is directed to an electronic device, having spacers without affecting the appearance of the electronic device.

The present invention provides an electronic device including a first module, a second module, at least one first spacer, and at least one second spacer. The first module has a carrying surface. The second module is slidably disposed on carrying surface and has a bottom surface opposite to the carrying surface. The first spacer is fixed on the carrying surface and suitable for being slid on the bottom surface. The second spacer is fixed on the bottom surface and suitable for being slid on the carrying surface. The first spacer and the second spacer are always kept within an overlapping region between the bottom surface and the carrying surface.

In the present invention, the first spacer and the second spacer are always kept within the overlapping region between the bottom surface and the carrying surface. Therefore, regardless of the position to where the second module is slid with respect to the first module, the first spacer and the second spacer are hidden between the first module and the second module without being exposed, and thus will not affect the appearance of the electronic device.

In order to make the features and advantages of the present invention more clear and understandable, the following embodiments are illustrated in detail with reference to the appended drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
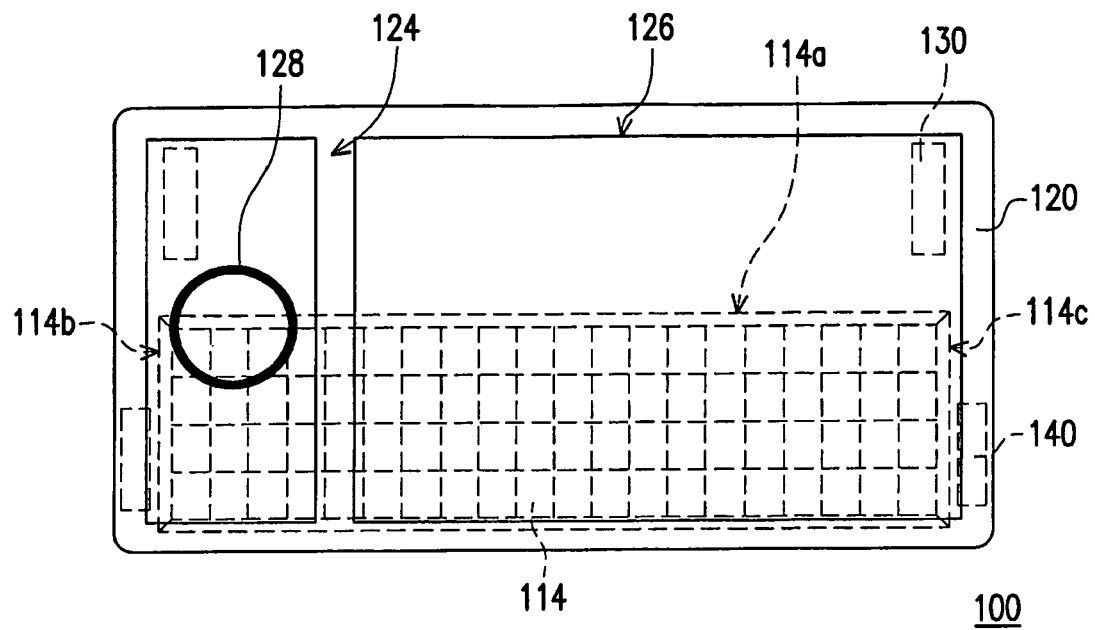
FIG. 1A is a top view of an electronic device in an overlapping state according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In the following embodiments, the electronic device is, for example, a ultra mobile personal computer (UMPC), a smart phone, or a personal digital assistant (PDA). However, in other not shown embodiments, the electronic device can also be a mobile phone or other electronic devices composed of two modules capable of being slid with respect to each other.

Figure 1B:
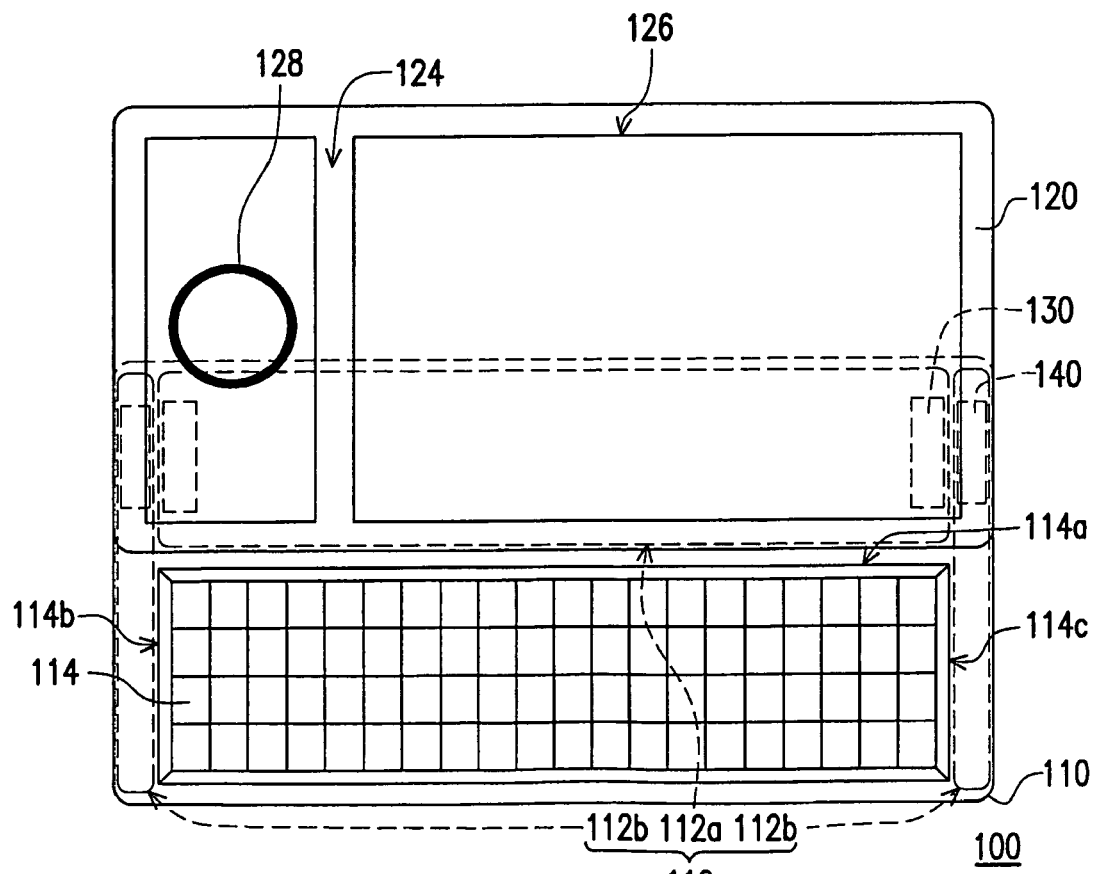
FIG. 1B is a top view of the electronic device in a sliding state in FIG. 1A.
Figure 2A:
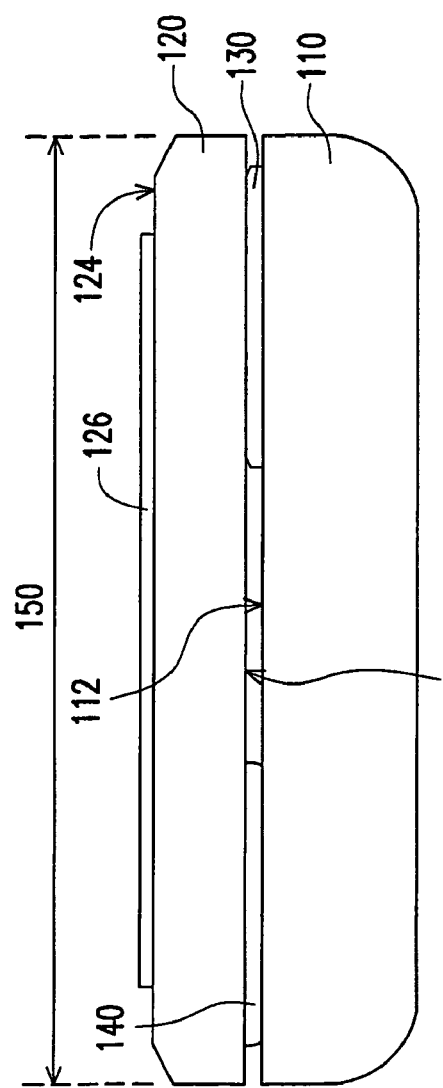
FIG. 2A is a side view of the electronic device in FIG. 1A.
Figure 2B:
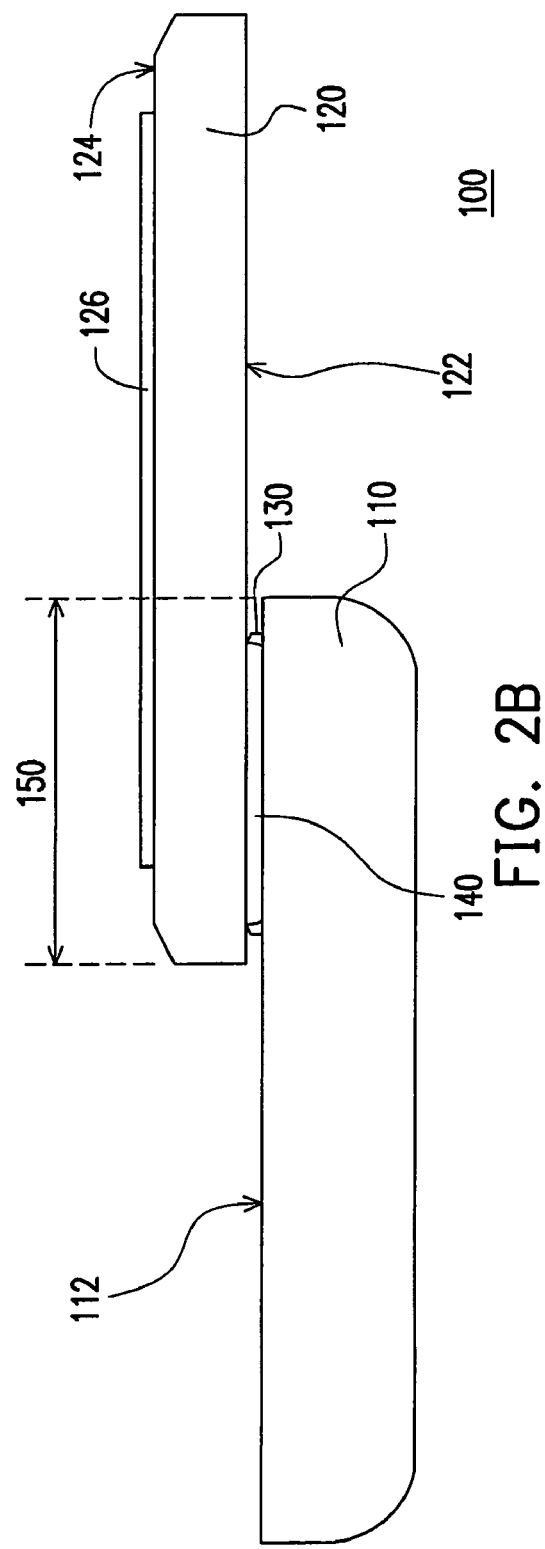
FIG. 2B is a side view of the electronic device in FIG. 1B.

FIG. 1A is a top view of an electronic device in an overlapping state according to an embodiment of the present invention, and FIG. 1B is a top view of the electronic device in a sliding state in FIG. 1A. FIG. 2A is a side view of the electronic device in FIG. 1A, and FIG. 2B is a side view of the electronic device in FIG. 1B. Referring to FIGS. 1A, 1B, 2A, and 2B, an electronic device 100 includes a first module 110 and a second module 120. The first module 110 has a carrying surface 112. The second module 120 is slidably disposed on the carrying surface 112 of the first module 110, and has a bottom surface 122 opposite to the carrying surface 112.

Further, the electronic device 100 further includes at least one first spacer 130 (in FIG. 1A, merely a pair of first spacers 130 are schematically shown) and at least one second spacer 140 (in FIG. 1A, merely a pair of second spacers 140 are schematically shown). The pair of first spacers 130 are fixed on the carrying surface 112 and is capable of being slid on the bottom surface 122 of the second module 120 with the first module 110. The pair of second spacers 140 are fixed on the bottom surface 122 and is capable of being slid on the carrying surface 112 of the first module 110 with the second module 120. The pair of first spacers 130 and the pair of second spacers 140 are always kept within an overlapping region 150 between the bottom surface 122 and the carrying surface 112.

In this embodiment, the pair of first spacers 130 and the pair of second spacers 140 are bar-shaped, and extend in a direction parallel to the sliding direction thereof. However, in another embodiment, the first spacer and the second spacer can further be dot-shaped or of other shapes. Further, the pair of first spacers 130 and the pair of second spacers 140 are made of, for example, polyoxymethylene resin (POM, so called as plastic steel).

The first module 110 can further includes a keyboard 114 disposed on the carrying surface 112. The second module 120 is capable of being slid between a first position (as shown in FIGS. 1A and 2A) and a second position (as shown in FIGS. 1B and 2B) with respect to the first module 110, such that the keyboard 114 is accommodated between the first module 110 and the second module 120, or exposed out of the first module 110 and the second module 120.

The second module 120 further includes a top surface 124, a display screen 126, and an inputting unit 128. The top surface 124 is opposite to the bottom surface 122 of the first module 110, and the display screen 126 and the inputting unit 128 are disposed on the top surface 124. The inputting unit 128 is, for example, a navigation key, and is located at a side of the display screen 126.

In this embodiment, the carrying surface 112 surrounds the keyboard 114, and includes a carrying region 112a and two sliding regions 112b. The keyboard 114 has a first side 114a, a second side 114b, and a third side 114c. The first side 114a is connected to the second side 114b and the third side 114c. The carrying region 112a is adjacent to the first side 114a, and the sliding regions 112b are adjacent to the second side 114b and the third side 114c respectively. Further, the pair of first spacers 130 are fixed in the carrying region 112a of the carrying surface 112, and the pair of second spacers 140 are capable of being slid on the sliding regions 112b respectively.

As shown in FIGS. 1A and 2A, when the second module 120 is in the first position, the bottom surface 122 covers the carrying surface 112 and the keyboard 114 completely, such that the carrying region 112a, the sliding regions 112b, and the keyboard 114 are within the overlapping region 150. At this time, the pair of first spacers 130 in the carrying region 112a and the pair of second spacers 140 in the sliding regions 112b are within the overlapping region 150.

It should be noted that, when the second module 120 is in the first position, as shown in FIG. 1A and FIG. 2A, the overlapping region 150 is substantially rectangular, and the pair of first spacers 130 and the pair of second spacers 140 are adjacent to four corners of the overlapping region 150 respectively. Therefore, the first module 110 and the second module 120 can maintain a constant pitch therebetween through the pair of first spacers 130 and the pair of second spacers 140, so as to prevent the first module 110 and the second module 120 from rubbing with each other during sliding, thus avoiding being damaged. Further, the first module 110 and the second module 120 can also be kept in a parallel state through the pair of first spacers 130 and the pair of second spacers 140.

When the second module 120 is slid with respect to the first module 110 from the first position (FIGS. 1A and 2A) towards the second position (FIGS. 1B and 2B), the pair of second spacers 140 are slid with the second module 120 on the carrying surface 112 along the sliding regions 112b respectively. Further, as shown in FIGS. 1B and 2B, when the second module 120 is in the second position, the bottom surface 122 merely covers a portion of the carrying surface 112.

It should be noted that, when the second module 120 is in the second position, as shown in FIGS. 1B and 2B, as the pair of second spacers 140 have been slid with the second module 120 into the carrying region 112a, the pair of first spacers 130 and the pair of second spacers 140 are still kept within the overlapping region 150. In other words, regardless of the position of the second module 120 between the first position and the second position, the pair of first spacers 130 and the pair of second spacers 140 are kept within the overlapping region 150 between the first module 110 and the second module 120. Therefore, compared with conventional techniques, the appearance of the electronic device 100 of the present invention will not be affected by the pair of first spacers 130 and the pair of second spacers 140.

In this embodiment, the sliding regions 112b are merely used for the pair of first spacers 140 to be slid thereon respectively, and thus the sliding regions 112b can be narrow. Accordingly, the keyboard 114 can have a large using area, or the electronic device 100 can have a small area of the module.

In this embodiment, the electronic device 100 including merely a pair of first spacers 130 and a pair of second spacers 140 are illustrated. However, the number of the first spacer 130 and the second spacer 140 is not limited to that in the above embodiment. In other embodiments not shown, the number of the first spacer 130 disposed in the carrying region 112a can be one, three, or more than three.

In view of the above, in the present invention, as the first spacer and the second spacer can be always kept within the overlapping region between the bottom surface of the second module and the carrying surface of the first module. Therefore, regardless of the position to where the second module is slid with respect to the first module, the first spacer and the second spacer are hidden between the first module and the second module without being exposed, and thus will not affect the appearance of the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   a first module, having a carrying surface;
   a second module, slidably disposed on the carrying surface, and having a bottom surface opposite to the carrying surface;
   at least one first spacer, fixed on the carrying surface, and leaning against the bottom surface; and
   at least one second spacer, fixed on the bottom surface, and leaning against the carrying surface, wherein the first spacer and the second spacer are always kept within an overlapping region between the bottom surface and the carrying surface, and a first moving path of the first spacer does not overlap a second moving path of the second spacer.

2. The electronic device according to claim 1, wherein the first module further comprises a keyboard, and the second module is suitable for being slid between a first position and the a second position with respect to the first module, when the second module is in the first position, the bottom surface covers the keyboard, and when the second module is in the second position, the bottom surface exposes the keyboard.

3. The electronic device according to claim 2, wherein the carrying surface surrounds the keyboard.

4. The electronic device according to claim 2, wherein the carrying surface comprises a carrying region and two sliding regions, the carrying region is adjacent to a first side of the keyboard, the sliding regions are adjacent to a second side and a third side of the keyboard respectively, and the first side is connected to the second side and the third side.

5. The electronic device according to claim 4, comprising a pair of first spacers and a pair of second spacers, wherein when the second module is in the first position, the pair of first spacers are in the carrying region, and the pair of second spacers are in the sliding regions respectively, and when the second module is slid from the first position to the second position, the pair of second spacers are slid on the carrying surface from the sliding regions into the carrying region.

6. The electronic device according to claim 2, wherein the overlapping region is substantially rectangular shaped, and when the second module is in the first position, the pair of the first spacers and the pair of the second spacers are adjacent to four corners of the overlapping region respectively.

7. The electronic device according to claim 1, wherein the spacers extend in a direction parallel to the sliding direction of the spacers.

8. The electronic device according to claim 1, wherein the material of the spacers comprises polyacetal or polyoxymethylene (POM) resin.

9. The electronic device according to claim 1, wherein the second module further comprises a top surface opposite to the bottom surface and a display screen disposed on the top surface.

10. The electronic device according to claim 9, wherein the second module further comprises an inputting unit, disposed on the top surface, and located at a side of the display screen.

11. The electronic device according to claim 10, wherein the inputting unit is a navigation key.

* * * * *